United States Patent [19]

Hohman

[11] 4,243,423

[45] Jan. 6, 1981

[54] GLASS MANUFACTURING

[75] Inventor: Charles M. Hohman, Granville, Ohio

[73] Assignee: Owens-Corning Fiberglas Corporation, Toledo, Ohio

[21] Appl. No.: 83,727

[22] Filed: Oct. 10, 1979

Related U.S. Application Data

[63] Continuation-in-part of Ser. No. 912,659, Jun. 5, 1978, abandoned.

[51] Int. Cl.³ .............................................. C03C 3/04
[52] U.S. Cl. ........................................ 106/54; 65/27; 65/134; 106/DIG. 8
[58] Field of Search ..................... 65/27, 134; 106/54, 106/DIG. 8

[56] References Cited

U.S. PATENT DOCUMENTS

| | | | |
|---|---|---|---|
| 2,366,473 | 1/1945 | Blair | 106/52 |
| 2,877,124 | 3/1959 | Welsch | 106/54 |
| 3,274,006 | 9/1966 | McKinnis | 106/50 |
| 3,880,639 | 4/1975 | Bodner et al. | 65/134 |
| 3,914,364 | 10/1975 | Engelleitner et al. | 264/117 |
| 4,050,947 | 9/1977 | Ahlgren et al. | 106/54 X |
| 4,074,989 | 2/1978 | Brzozowski et al. | 65/27 |
| 4,074,990 | 2/1978 | Brzozowski et al. | 65/27 |
| 4,074,991 | 2/1978 | Brzozowski et al. | 65/27 |

OTHER PUBLICATIONS

Dana "System of Mineralogy", vol. II, 7th edition, John Wiley, & Sons, pp. 343-353.
Glastechnische Berichte 49(2) pp. 37-42 (Feb. 1976) "Raw Materials Containing Boric Anhydride for the Glass Industry" by Sattler.

*Primary Examiner*—Arthur D. Kellogg
*Attorney, Agent, or Firm*—Ronald C. Hudgens; Patrick P. Pacella; Robert F. Rywalski

[57] ABSTRACT

An improvement is provided in forming a $B_2O_3$ containing glass from heated glass batch agglomerates by using an uncalcined, mineral sodium calcium borate which contains chemically bound water to form the agglomerates. These agglomerates can be heated, prior to melting, to a temperature in excess of that needed to substantially remove all of said chemically bound water without the water release causing the agglomerates to disintegrate.

10 Claims, No Drawings

GLASS MANUFACTURING

CROSS REFERENCE TO RELATED APPLICATIONS

This application is a continuation-in-part of U.S. Ser. No. 912,659, filed June 5, 1978 now abandoned.

FIELD OF INVENTION

The present invention relates generally to glass manufacturing and, more particularly, it relates to glass manufacturing wherein the glass batch is first formed into agglomerates, for example with water, and subsequently melted to produce a molten glass.

BACKGROUND

It is known in the glass manufacturing art that glass batch materials may be formed into agglomerates and that these agglomerates may then be discharged to a melting furnace for vitrification of the batch ingredients. These agglomerates are, generally, composite, integral, self supporting masses of batch materials and may be in the form of extrusions, discs, briquettes, or pellets. Exemplary teachings as to this may be found in U.S. Pat. No. 3,880,639. For further exemplification, as to a manner in which glass batch may be formed into agglomerates, as for example, by forming the batch into pellets with water, reference may be had to U.S. Pat. No. 3,914,364 which is assigned to the Dravo Corporation. U.S. Pat. No. 3,366,473 also discloses forming glass batch into agglomerates.

In the fibrous glass manufacturing industry, $B_2O_3$ containing glasses have been manufactured extensively for some period of time. Exemplary of such glasses are those set forth in U.S. Pat. Nos. 2,877,124 and 2,882,173 which compositions are generally employed for thermal insulation products. Generally the glasses which have been commercialized in the past for such products may be referrred to as soda-lime aluminoborosilicate glasses in that they substantially comprise a combination of $Na_2O$, $CaO$, $Al_2O_3$, $B_2O_3$, and $SiO_2$. The source of $B_2O_3$ in these glasses has commonly been a borax, i.e., borax itself, anhydrous borax or 5 mole borax. If desired, boric acid may also be employed, as the $B_2O_3$ source, as may ulexite or colemanite as taught in U.S. Pat. No. 3,274,006.

The manufacture of $B_2O_3$ containing glasses, for example the above fibrous glass products, by the use of agglomerates is highly desirable. This is especially true in those instances where the agglomerates are heated at a temperature and for a time sufficient to remove water, i.e., dry them (as where the batch has been formed into pellets with water) and then to further heat these pellets to an elevated temperature, which is short of their sintering or melting temperature, followed by discharging such preheated pellets into the melting furnace. Applicant has found however, that all $B_2O_3$ sources are not equivalent for such a process. For example, when a borax is employed as the source of $B_2O_3$, agglomerates formed by consolidating the batch into individualized units with water, for example as pellets, may slump when heated which substantially precludes the pellets from being conveyed to the melting furnace in an acceptable economical manner. That is, when a borax is employed to form batch into pellets with water, for example pellets on the size of at least about ¼ inch, and generally in the range of about ¼ to ¾ inch, with the water employed for pelletization being about 5 to about 20 percent by weight, these pellets have a latent, unacceptable rheological property. As several layers of these pellets are first heated under conditions of time and temperature to dry them and then further heated (preheated) to a temperature short of their sintering, or fusion, temperature, instead of remaining as non-aggregated, discrete flowable pellets which can be conveniently conveyed to a melting furnace, they transform, or coalesce into an unacceptable, aggregated mass. Boric acid likewise, is not suitable for such a process because it has an unacceptably low softening or fusion point which severely handicaps the ability to heat such pellets, prior to discharging or conveying them into the melting furnace, to an elevated temperature. Colemanite and calcined colemanite are also not satisfactory for purposes of making the above indicated $B_2O_3$ containing glass products from preheated pellets. For example, calcined colemanite is economically not suited for soda-lime alumino borosilicate glasses because these glasses are relatively inexpensive glasses and the employment of such a material as the $B_2O_3$ source in the agglomerate cannot be competively tolerated.

U.S. Pat. Nos. 4,074,989, 4,074,990, and 4,074,991 are directed to methods for preparing $B_2O_3$ containing batch in the form of pellets respectively employing anhydrous boric acid, colemanite and boric acid. As indicated previously, such materials are not suitable for the purposes contemplated herein. For example, $B_2O_3$ has a melting point on the order of 450° to 500° C. which substantially precludes pellets made with such a material from being heated to an elevated temperature. Boric acid, on the other hand, tends to steam distill when the water containing agglomerates are heated and thus cause $B_2O_3$ losses.

U.S. Pat. No. 4,074,990 discloses the use of colemanite as a batch ingredient for glass manufacturing. If the colemanite is not calcined, in accordance with that patent, the agglomerates (pellets) cannot be heated above 410° C.; otherwise the pellets will disintegrate. Obviously this is not acceptable because it limits the temperature to which the pellets can be heated before being supplied to a melter and this is an especially serious handicap when it is desired to salvage sensible heat in flue gases by using them to preheat the agglomerates by passing the gases directly through a bed of such agglomerates. If it is desired to heat the pellets above 410° C., this patent states that the chemically bound water must be removed, by calcination, prior to using the material to form pellets. Such required pre-processing serves to increase batch cost and, consequently, glass cost.

Thus, in accordance with this invention, Applicant provides for an improvement in processes of the above type as relates to glass manufacturing wherein a $B_2O_3$—containing glass is produced by forming batch ingredients therefor, including an uncalcined, mineral sodium calcium borate which contains about 5 or more moles of chemically combined water as a source of $B_2O_3$, into a plurality of individual agglomerates with water. Preferably the agglomerates will be in the form of pellets containing about 5-20% by weight free water. These agglomerates may then be dried, under conditions of time and temperature to remove substantially all unbound water and convert them into dried, free-flowing agglomerates; the dried, free-flowing agglomerates may then be further heated, or preheated, to temperature higher than that needed to remove substantially all chemically bound water, for example a temperature in excess of about 500° C. but short of the fusion temperature of the composition, to produce a mass of hot, free-flowing non-aggregated, dried agglomerates which may be transported in any convenient manner to a glass melter for melting. There is absolutely nothing in the above prior art which would suggest, certainly not with any predictability of success, that such borates can be employed as the source of $B_2O_3$ in such agglomerates so as to allow one to practice such a process without substantial steam distillation losses and without disintegration by release of chemical water.

Acceptable results will be realized when the borate is the major (e.g. greater than 50%) source of $B_2O_3$ in the batch. Outstanding results are obtained when such borate is present as substantially the sole source or, for example, an admixture with a borax may be employed with the weight ratio of such borate to such borax being at least about 2:1. The batch may be formed into agglomerates using conventional techniques. For example, when pellets are formed, these pellets may be formed by hand, but it is preferred to employ commercial pelletizing equipment such as a rotary disk like that commercially available from the Dravo Corporation. When pelletizing on a disk with water, it will be found that most preferably the particle size of the ulexite will be −200 mesh. Outstanding results will be obtained in practicing this method when producing a soda-lime alumino borosilicate glass consisting essentially of the following in approximate weight percent: $SiO_2$ 59–64; $Al_2O_3$ 3.5–5.5; CaO 7.5–9.5; MgO 0.1–3.7; $B_2O_3$ 4–12; $Na_2O$ 12–16; $K_2O$ 0.2–2.8; $Fe_2O_3$ 0.1–0.3; $TiO_2$ 0–0.4; SrO 0–0.4; BaO 0–2.4; $Li_2O$ 0–0.2; and $SO_3$ 0–0.5. Preferably the batch for such a composition will comprise sand, clay, dolomite or burnt dolomite, the uncalcined, mineral sodium calcium borate and soda-ash. When producing a $Na_2O$ and $B_2O_3$ containing glass, as will subsequently be seen, by using such borate and a sodium carbonate as the sources of $B_2O_3$ and $Na_2O$, these materials uniquely interact to form agglomerates having unexpectedly high dry strengths. The significance of this is readily apparent.

Uncalcined, mineral sodium calcium borates contemplated for use herein may be specifically exemplified by the formula $NaCaB_5O_9 \cdot X\ H_2O$, wherein X is between 5 and 8. More specifically such borates are represented by natural occurring deposits of ulexite and/or probertite. Such deposits will compositionally vary depending upon the source. For example, domestic source ulexite on a wet basis generally includes about 25 to 29 percent $B_2O_3$, about 21 to 26 percent CaO, about 5 to 13 percent $SiO_2$, about 4 to 5 percent $Na_2O$, and on the order of slightly less than 1 to slightly in excess of 2 percent by weight $Al_2O_3$. Such ulexites include small amounts of other metal oxides and also volatiles such as water and carbon dioxide. Ulexite obtained from Turkey contains probertite and typically will contain about 38 to 39 percent $B_2O_3$, 15 to 18 percent CaO, 2 to 3 percent $SiO_2$, 4 to 7 percent $Na_2O$, and trace amount of other oxides including $Al_2O_3$. That material likewise will include volatiles such as for example, water. Ulexite and probertite can be easily detected in these sources by x-ray analysis.

While the foregoing adequately sets forth the invention to enable those skilled in the art to make and use it, nonetheless, further exemplification follows.

EXAMPLE I

A $B_2O_3$ containing batch was formulated employing 1121 parts by weight of Central sand, 325 parts by weight of nepheline syenite, 149 parts by weight burnt dolomite, 171 parts by weight Spore limestone, 372 parts by weight of 5 mole borax, 350 parts by weight soda-ash, and 15 parts by weight salt-cake. Portions of that batch were pelletized with water to produce generally spheroidal pellets having a water content in the range of about 5 to about 20 percent. The diameters of the pellets were about ¼ inch to about ⅜ inch. These pellets were then positioned in several layers upon each other in a crucible having a height of about one inch with a crucible then being positioned in an electric furnace held at a temperature of about 1200° F. It was observed, that the pellets did not remain as a dried, non-agglomerated mass of discrete, flowable pellets but they coalesced, or slumped, into an aggregated mass. It will be immediately apparent that such pellets cannot be be conveniently transported or conveyed to a melting furnace for fusion.

Substantially similar results were obtained when anhydrous borax was used instead of 5 mole borax as the source of $B_2O_3$ in a pelletized batch for a soda lime alumino borosilicate glass.

In a separate experiment 5 mole borax was employed as the source of $B_2O_3$ for producing a common alkaline earth, alumino borosilicate textile fiber glass i.e., E glass which contains less than about 1 percent $Na_2O$. Pelletization of the batch ingredients for that composition with water followed by drying and further heating showed that the pellets fractured as a result of an expansion or blooming characteristic of the sodium borate.

EXAMPLE II

In an experiment similar to I above, another $B_2O_3$ containing batch was formulated from about 1098 parts by weight of Central sand, about 315 parts by weight naph. syenite, about 154 parts by weight of burnt dolomite, about 170 parts by weight of 5 mole borax, about 348 parts by weight of domestic ulexite, about 400 parts by weight of soda-ash and about 15 parts by weight of salt-cake. Pellets made in a similar fashion were positioned in several layers in the crucible and likewise heated. In contrast to the result in Example I, where the pellets slumped into an aggregated mass, these pellets remain as discrete free-flowing agglomerates. That is, although these pellets contact each other, they remain in such condition in a non-aggregated discrete form. Hence, it will readily be apparent that such pellets when preheated short of their sintering temperature can be transported by conventional materials handling equipment to a melting furnace for melting in a manner quite simple and economical compared to those of Example I. Thus, such pellets after they become dry by heating can be further heated to an elevated temperature, for example, in excess of 500° C. but short of the fusion temperature, and transported to a melting furnace without encountering the slumping problem encountered when using a borax.

The same outstanding results were obtained when employing pellets made from a batch of about 45.5 percent by weight Central sand, 7.8 percent by weight Ewing clay, 3 percent by weight burnt dolomite, about 0.3 percent weight Spore limestone, about 23.6 percent by weight domestic ulexite, and about 19.9 percent by weight soda-ash.

Substantially similar results are obtained when pellets are formed as described herein with ulexite as a source of $B_2O_3$ and the pellets are positioned on a belt conveyor, for example, to a height of on the order of 1 to 1½ inches, and then these pellets are heated with dry air, for example, indirectly heated air, to a temperature and for a time sufficient to dry the pellets and then further heated to an elevated temperature short of the fusion point of those pellets. No slumping or pellet disintegration is encountered and such hot pellets for example, pellets at a temperature in excess of 500° C. can be transported to the melting furnace and melted therein.

EXAMPLE III

The following shows the unexpected benefit of using probertite or ulexite as the $B_2O_3$ source and soda-ash as the $Na_2O$ source in forming pellets of a $Na_2O$ and $B_2O_3$ containing silicage glass. Water containing glass batch pellets were manufactured using various combinations of sand, soda-ash, ulexite and clay for the batch compositions. Table 1 shows the compositions along with the water content of the pellets. The green strengths of the pellets were measured, the pellets then dryed and the dry pellet strength then determined. Drying was done in a laboratory air convection oven at a temperature of about 230°-240° F. for about 3 hours. Reference to Table 1 will clearly indicate the unexpected, unique, synergistic interaction of ulexite and soda-ash in producing pellets, or agglomerates, with high dry strengths. Similar results will be realized with probertite.

TABLE I

| Composition (grams) | | | | Pellet $H_2O$ Content (% - Dry Basis) | Pellet Green Strength (lbs.) | Pellet Dry Strength (lbs.) |
| --- | --- | --- | --- | --- | --- | --- |
| Sand | Soda Ash | Ulexite | Clay | | | |
| 710 | 312 | 357 | 122 | 17.8 ± 1.4 | 5.5 ± 1.8 | 41 ± 11 |
| 931 | 409 | — | 160 | 16.7 ± 0.3 | 10.9 ± 1.8 | 2.2 ± 0.6 |
| 896 | — | 450 | 154 | 12.7 ± 5.0 | 1.5 ± 0.3 | 11.8 ± 1.8 |
| 773 | 339 | 388 | — | 16.3 ± 0.4 | 7.8 ± 0.7 | 40 ± 9.0 |
| 773 | 339 | 388 | — | 14.2 ± 0.5 | 6.2 ± 1.2 | 57 ± 13 |

Accordingly in order to obtain agglomerates with synergistically improved dry strengths, the before mentioned soda lime aluminoborosilicate glasses containing about 12–16% $Na_2O$ and about 4–12% $B_2O_3$ will desirably employ soda-ash as substantially the sole source of $Na_2O$ and ulexite or probertite, or a mixture thereof, as substantially the sole source of $B_2O_3$.

Preferably the present invention will be practiced by forming the batch ingredients into water containing agglomerates, drying the agglomerates and preheating them to a temperature short of their fusion, or sintering, temperature and discharging the preheated pellets to a melter. Preferably the pellets are preheated to a temperature in excess of about 500° C. Desirably the pellets will be manufactured on a rotary disc pelletizer. While pelletizing is art and the pelletizer will need to be adjusted for optimum results on any specific glass batch, it is desirable to control the pelletizer using the water control scheme generally set forth in copending application U.S. Ser. No. 965,632 filed on behalf of Mr. Seng. That is a pivotally supported paddle type sensor is employed to control the feed of water to the pelletizer. Preferably the paddle will be located in the finished pellet stream, as set forth in copending application now abandoned Ser. No. 974,470 filed on behalf of Mr. Henry, at about an 8 to 9 o'clock position. The water supply will include one duct supplying a constant flow of water to a main supply line and a second duct containing a solenoid valve also in fluid communication with the main supply. The paddle sensor is used to operate the solenoid valve in an on-off fashion, as set forth in the above Seng application so as to produce substantially uniform size pellets. Batch will be supplied to the pelletizer along a chord of the disc between about the 5:30 and 6:30 positions with the water supply being furnished by sprays located generally on a chord between the 4 and 8 o'clock positions and to right of a diameter running through the 6 and 12 o'clock positions of the circular disc of the pelletizer. Desirably the pelletizer will also be equipped with a rotary scraper device. This device includes two pairs of generally normally related arms with each arm having a radius of about one-half the radius of the pelletizer disc and has its axis of rotation about midway along the radius of the disc drawn to about the 3 o'clock position. One pair of arms, which may be viewed as a diameter of the circle through which the device rotates, includes scrapers at its diametric end portions adapted to scrape the sidewall of the rotating disc pelletizer. The other pair of arms include diametrically opposed scrapers operating closely adjacent to the bottom of the disc of the pelletizer. Most desirably the pellets will be dried and preheated in accordance with the teachings of U.S. Ser. Nos. 031,368 and 031,369, both now abandoned filed on behalf of Messrs. Hohnman, Seng, Henry and Propster, both of which are hereby incorporated by reference, and then melted in either a fossil fueled fired melter or an electrically powered melter. Most suitable operation will be effected by using the above uncalcined, mineral sodium calcium borates containing at least 5 moles of chemical water as substantially the sole source of boric acid or in combination with a borax, e.g. 5 mole borax, with the amount of the latter being less than about about 2–3% by weight of the batch.

I claim:

1. In a glass manufacturing method comprising combining batch ingredients and water into agglomerates, heating said agglomerates, discharging said agglomerates to a melting furnace for melting, the improvement wherein said glass is a $B_2O_3$ containing glass and wherein said batch ingredients contain an uncalcined, mineral sodium calcium borate as a major source of $B_2O_3$.

2. The improvement of claim 1 wherein said borate is present as a compound of the formula $NaCaB_5O_9 \cdot XH_2O$ wherein X is between about 5 to about 8.

3. The improvement of claim 2 wherein said borate is present as ulexite.

4. The improvement of claim 2 wherein said borate is present as probertite.

5. The improvement of claim 2 wherein said agglomerates are pellets, said pellets being heated to a temperature in excess of about 500° C. without disintegration.

6. The improvement of claim 1 wherein said glass also contains $Na_2O$, said batch containing sodium carbonate a source of said $Na_2O$.

7. The improvement of claim 6 wherein said borate is ulexite.

8. The improvement of claim 1 wherein said borate contains at least 5 moles of chemically bound water and wherein said heating is done at a temperature in excess of that needed to remove substantially all of said chemically bound water without disintegration.

9. A $B_2O_3$ glass forming pellet having a temperature in excess of about 500° C., said pellet having been formed by combining batch ingredients and water and wherein said batch ingredients contain an uncalcined, mineral sodium calcium borate with in excess of 5 moles of chemical water.

10. The improvement of claim 6 wherein said glass contains about 12 to about 16 weight percent of $Na_2O$ and about 4 to about 12 weight percent $B_2O_3$, and wherein the soda-ash is substantially the sole source of $Na_2O$ and substantially the sole source of $B_2O_3$ being ulexite and/or probertite, said agglomerates having synergistically improved dry strengths by virtue of said soda-ash and said ulexite and or probertite.

* * * * *